United States Patent
Hsu et al.

(10) Patent No.: US 8,310,797 B2
(45) Date of Patent: Nov. 13, 2012

(54) SHORT CIRCUIT PROTECTION CIRCUIT, SHORT CIRCUIT PROTECTION METHOD AND POWER SUPPLY DEVICE THEREOF

(75) Inventors: Hung-Ta Hsu, Taipei County (TW); Chieh-Wen Cheng, Hsinchu (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 184 days.

(21) Appl. No.: 12/854,878

(22) Filed: Aug. 11, 2010

(65) Prior Publication Data

US 2011/0317314 A1    Dec. 29, 2011

(30) Foreign Application Priority Data

Jun. 23, 2010   (TW) ................................ 99120514 A

(51) Int. Cl.
*H02H 9/08*    (2006.01)

(52) U.S. Cl. ...................................... 361/93.7; 361/93.9
(58) Field of Classification Search ..................... 361/18, 361/93.7–93.9
See application file for complete search history.

(56) References Cited

U.S. PATENT DOCUMENTS 4,525,765 A * 6/1985 Brajder ........................... 361/88
4,551,779 A * 11/1985 Murakami et al. .............. 361/86

* cited by examiner

*Primary Examiner* — Danny Nguyen
(74) *Attorney, Agent, or Firm* — Winston Hsu; Scott Margo

(57) ABSTRACT

A short circuit protection circuit for a power supply device includes a driving transistor, for controlling to output an input voltage to a load according to a first control voltage; a shutdown transistor, coupled with the driving transistor, for controlling a level of the first control voltage according to a second control voltage; and an energy storage module, coupled with the shutdown transistor, for storing energy of the input voltage, to output a specific voltage as the second control voltage in a specific interval after short-circuit occurs.

12 Claims, 5 Drawing Sheets

SHORT CIRCUIT PROTECTION CIRCUIT, SHORT CIRCUIT PROTECTION METHOD AND POWER SUPPLY DEVICE THEREOF

BACKGROUND OF THE INVENTION

1. Field of the Invention

The present invention relates to a short-circuit protection circuit, short-circuit protection method and power supply device, and more particularly, to a short-circuit protection circuit, short-circuit protection method and power supply device capable of stopping providing power to an electronic device quickly when short-circuit occurs, to prevent over-current from damaging the electronic device.

2. Description of the Prior Art

In order to ensure stability of power supply, a power supply device for providing power to an electronic device generally includes a short-circuit protection circuit, for quickly stopping providing power to the electronic device when short-circuit occurs, to prevent over-current from damaging the electronic device.

Please refer to FIG. 1, which is a schematic diagram of a conventional power supply device 10. The power supply device 10 provides power to a load 12 (i.e. an electronic device), and includes a power supply 102 and a short-circuit protection circuit 104. The power supply 102 outputs an input voltage Vin, and the short-circuit protection circuit 104 controls connection between the power supply 102 and the load 12. Under a normal situation, the short-circuit protection circuit 104 turns on the connection between the power supply 102 and the load 12, to transfer the input voltage Vin to the load 12. When short-circuit occurs, the short-circuit protection circuit 104 turns off the connection between the power supply 102 and the load 12, to stop outputting the input voltage Vin to the load 12, so as to prevent over-current from damaging the load 12.

Please refer to FIG. 2, which is a schematic diagram of the short-circuit protection circuit 104 in FIG. 1. The short-circuit protection circuit 104 includes a logic operating circuit 202, a shutdown transistor 204 and a driving transistor 206. The logic operating circuit 202 generates a control voltage Vcon2 to the shutdown transistor 204 according to the input voltage Vin and an over-current protection signal OCP, such that the shutdown transistor 204 can generate a control voltage Vcon1 to the driving transistor 206 accordingly. The driving transistor 206 is turned on to transfer the input voltage Vin to the load 12 according to the control voltage Vcon1, and generates a corresponding load current Iload. The shutdown transistor 204 and the driving transistor 206 are N-type metal oxide semiconductor (MOS) transistors. When short-circuit occurs, the logic operating circuit 202 outputs the control voltage Vcon2 with the same level as the input voltage Vin to the shutdown transistor 204 according to the over-current protection signal OCP and the input voltage Vin, such that the shutdown transistor 204 is turned on, so as to pull the control voltage Vcon1 from a level of a driving voltage Vdriver to a ground level (Vcon1=0V), such that the driving transistor 206 is turned off and stops outputting the input voltage Vin to the load 12, to prevent over-current from damaging the load 12 (i.e. electronic device).

However, as shown in FIG. 2, since the input voltage Vin is in practice provided with a system power source Vdd, the input voltage Vin should be the system power source Vdd minus a voltage across a resistor 208 when a total resistance from the system power source Vdd to the input voltage Vin is denoted by the resistor 208. In such a situation, when short-circuit occurs, over-current increases the voltage across the resistor 208, such that the input voltage Vin drops quickly. As a result, when the shutdown transistor 204 should be expected to be turned on according to the control voltage Vcon2 with the same level as that of the input voltage Vin, the control voltage Vcon1 cannot be pulled to ground quickly since the input voltage Vin is small, such that the driving transistor 206 is turned off too late, and thus the over-current damages the load 12.

In the prior art, a size of the shutdown transistor 204 is increased to accelerate pulling the control voltage Vcon1 to a ground level, so as to improve the issue that the driving transistor 206 is turned off too late. Nevertheless, the driving transistor 206 is still turned off too late, such that over-current damages the load 12. Thus, there is a need for improvement.

SUMMARY OF THE INVENTION

It is therefore an objective of the present invention to provide a short-circuit protection circuit, short-circuit protection method and power supply device.

The present invention discloses a short-circuit protection circuit for a power supply device. The short-circuit protection circuit includes a driving transistor, for controlling to output an input voltage to a load according to a first control voltage, a shutdown transistor, coupled to the driving transistor, for controlling a level of the first control voltage according to a second control voltage, and an energy storage module, coupled to the shutdown transistor, for storing energy of the input voltage, to output a specific voltage as the second control voltage in a specific interval after short-circuit occurs.

The present invention further discloses a short-circuit protection method for a power supply device. The short-circuit protection method includes steps of storing energy of an input voltage, and outputting a specific voltage as a control voltage in a specific interval after short-circuit occurs.

The present invention further discloses a power supply device, for providing power to a load. The power supply device includes a power supply, for outputting an input voltage, and a short-circuit protection circuit, coupled to the power supply. The short-circuit protection circuit includes a driving transistor, for controlling to output the input voltage to the load according to a first control voltage, a shutdown transistor, coupled to the driving transistor, for controlling a level of the first control voltage according to a second control voltage, and an energy storage module, coupled to the shutdown transistor, for storing energy of the input voltage, to output a specific voltage as the second control voltage in a specific interval after short-circuit occurs.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
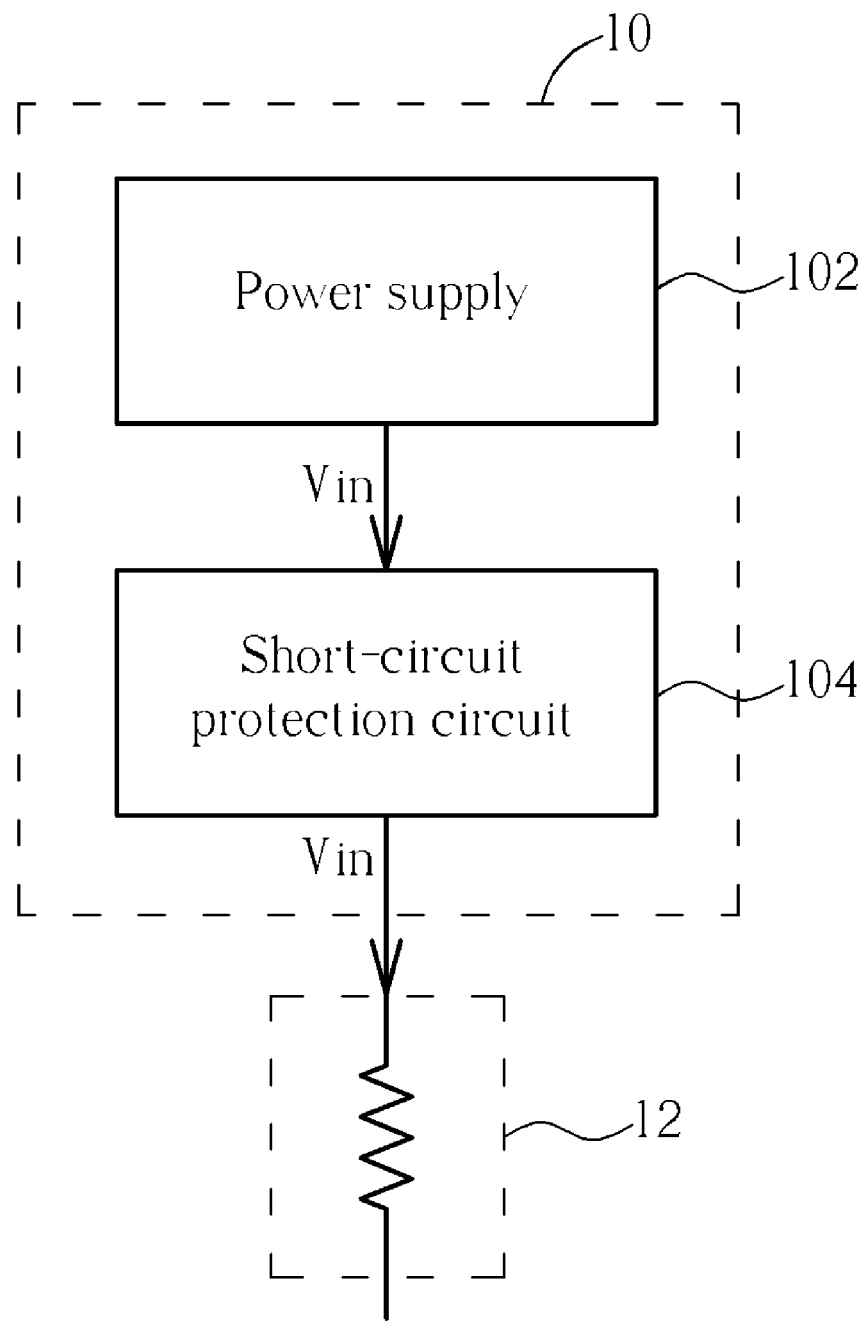
FIG. 1 is a schematic diagram of a conventional power supply device.
Figure 2:
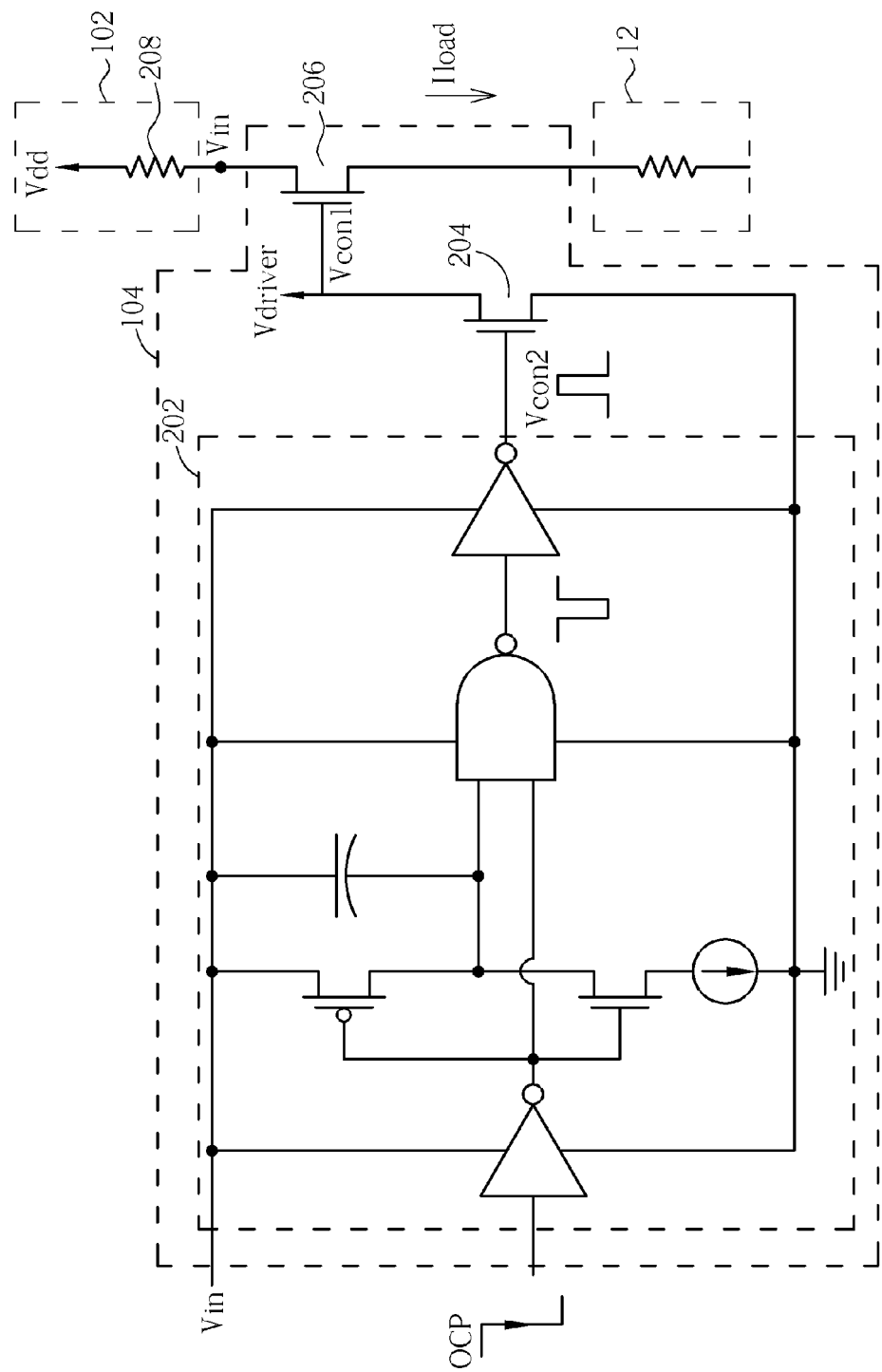
FIG. 2 is a schematic diagram of a short-circuit protection circuit in FIG. 1.
Figure 3:
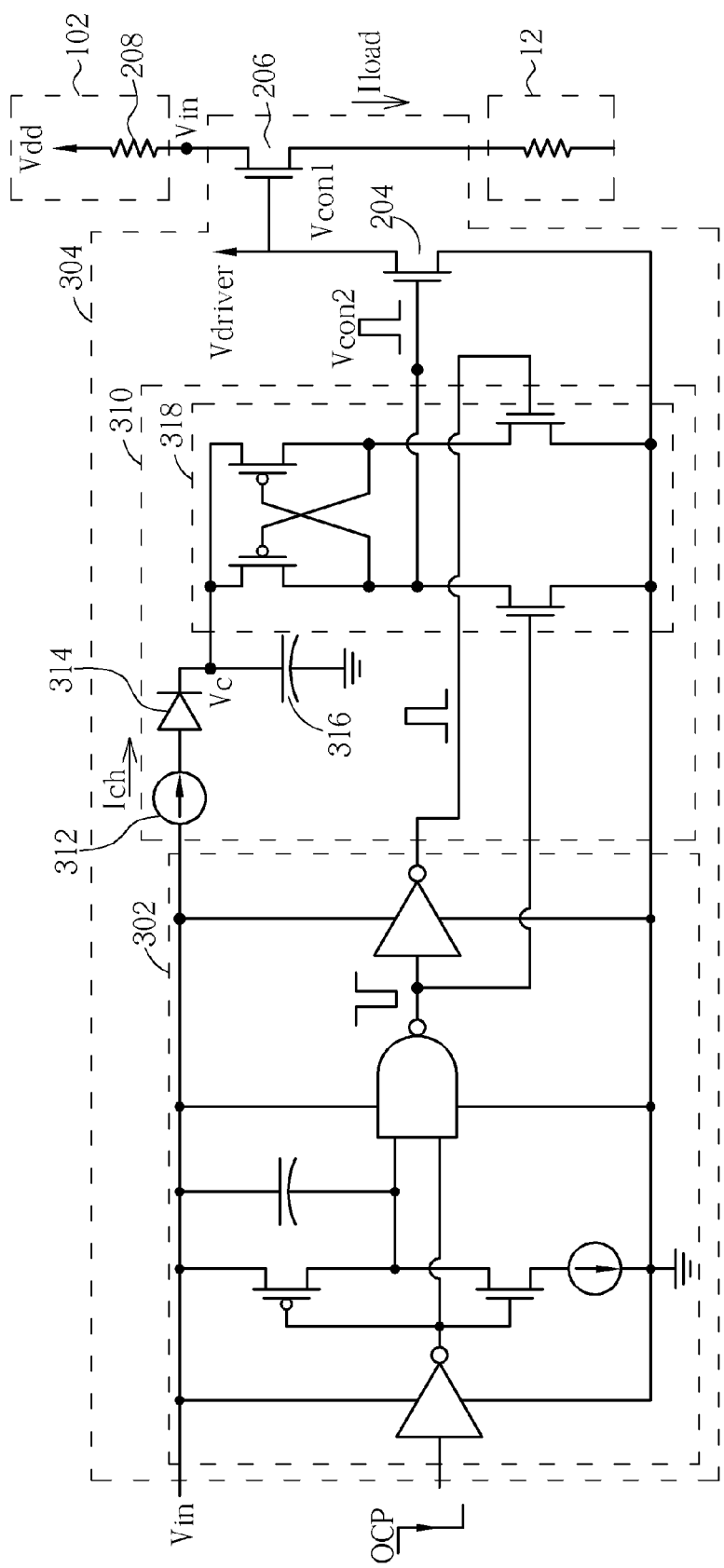
FIG. 3 is a schematic diagram of a power supply device according to an embodiment of the present invention.
Figure 4A:
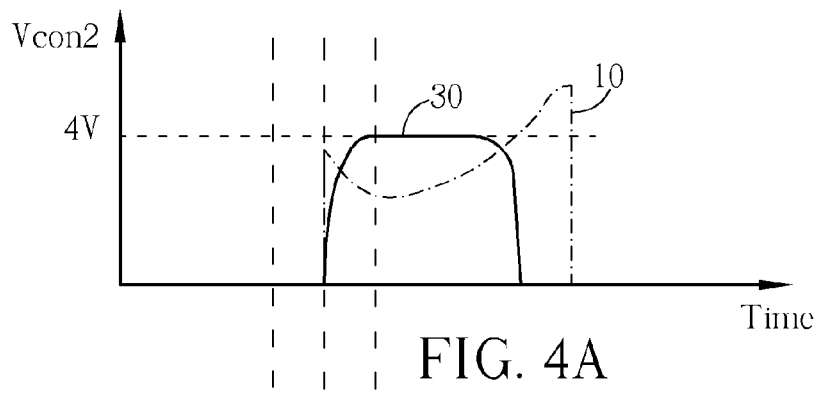
FIG. 4A to FIG. 4D are schematic diagrams of control voltages, an input voltage and a load current of the power supply device in FIG. 1 and the power supply device in FIG. 3.
Figure 4B:
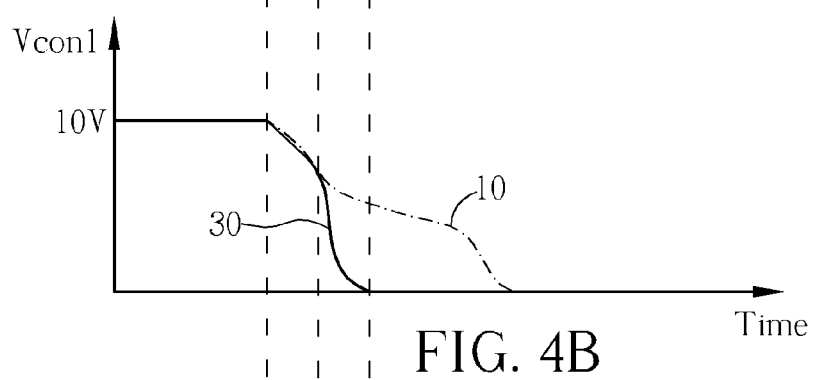
Figure 4C:
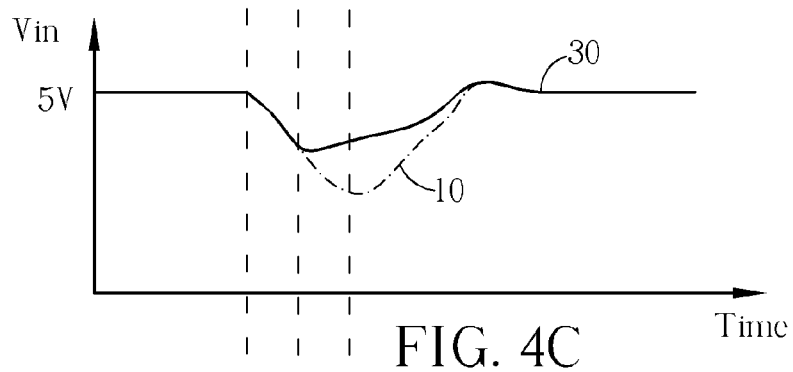
Figure 4D:
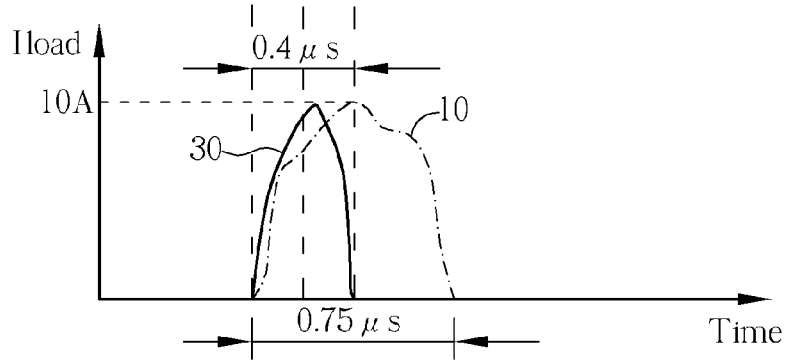

Please refer to FIG. 3, which is a schematic diagram of a power supply device 30 according to an embodiment of the present invention. Structure and operating principles of the power supply device 30 are similar to those of the power supply device 10, and thus elements and signals with the same functions are denoted by the same symbols for simplicity. In short, the power supply device 30 includes a short-circuit protection circuit 304 and the power supply 102, and differences between the power supply device 30 and the power supply device 10 are that the short-circuit protection circuit 304 of the power supply device 30 further includes an energy storage module 310, coupled between a logic operating circuit 302 and the shutdown transistor 204. The energy storage module 310 stores energy of the input voltage Vin, and outputs the control voltage Vcon2 with the same level with a capacitor voltage Vc in a specific interval when short-circuit occurs. As a result, the shutdown transistor 204 can be turned on quickly to pull the control voltage Vcon1 to the ground level, such that the driving transistor 206 is turned off and stops outputting the input voltage Vin to the load 12, so as to prevent over-current from damaging the load 12.

In detail, the energy storage module 310 includes a current source 312, a diode 314, a capacitor 316 and a level shifter 318. The current source 312 receives the input voltage Vin, and outputs a charging current Ich to charge the capacitor 316, to generate the capacitor voltage Vc across the capacitor 316. The diode 314 is turned on when the input voltage Vin minus a conduction voltage of the diode 314 is greater than the capacitor voltage Vc, such that the charging current Ich can charge the capacitor 316, and the diode 314 is turned off when the input voltage Vin minus the conduction voltage of the diode 314 is less than the capacitor voltage Vc, such that the charging current Ich stops charging the capacitor 316. The level shifter 318 outputs the control voltage Vcon2 with the same level with the capacitor voltage Vc when short-circuit occurs. In other words, before short-circuit occurs, the charging current Ich charges the capacitor 316 to store energy until the diode 314 is turned off when the capacitor voltage Vc is equal to the input voltage Vin minus the conduction voltage of the diode 314. As a result, after short-circuit occurs, the logic operating circuit 302 can control the level shifter 318 to utilize energy stored by the capacitor 316, to output the control voltage Vcon2 with the same level with the capacitor voltage Vc in a specific interval. Since the level of the capacitor voltage Vc is equal to a level of the input voltage Vin minus the conduction voltage of the diode 314 before the input voltage Vin drops quickly due to over-current, the level of the capacitor voltage Vc is much higher than a level of the input voltage Vin after the input voltage Vin drops quickly due to over-current. In comparison to the prior art, the shutdown transistor 204 can be turned on more quickly to pull the control voltage Vcon1 to the ground level, such that the driving transistor 206 is turned off and stops outputting the input voltage Vin to the load 12, so as to prevent over-current from damaging the load 12.

Please refer to FIG. 4A to FIG. 4D, which are schematic diagrams of the control voltage Vcon2, Vcon1, the input voltage Vin and the load current Iload of the power supply device 10 and the power supply device 30, respectively, where dotted lines and solid lines indicate the power supply device 10 and the power supply device 30, respectively. As indicated by the dotted lines shown in FIG. 4A to FIG. 4D, in the prior art, since the control voltage Vcon2 are at the same level as the input voltage Vin after the over-current protection signal OCP is triggered, the input voltage Vin drops as the over-current increases the voltage across the resistor 208 (i.e. the total resistance from the system power source Vdd to the input voltage Vin), and the control voltage Vcon2 drops as well, such that the control voltage Vcon1 cannot be pulled to the ground level to turn off the driving transistor 206 quickly. Therefore, the load current Iload is too high for a long period, and thus the over-current damages the load 12. In comparison, as indicated by the solid lines shown in FIG. 4A to FIG. 4D, in the present invention, after the over-current protection signal OCP is triggered, the level shifter 318 utilizes the energy stored by the capacitor 316 to output the control voltage Vcon2 at the same level as the capacitor voltage Vc in the specific interval. Since the level of the capacitor voltage Vc is much higher than the level of the input voltage Vin after the input voltage Vin drops quickly due to the over-current, the shutdown transistor 204 can be turned on more quickly to pull the control voltage Vcon1 to the ground level, such that the driving transistor 206 is turned off and stops outputting the input voltage Vin to the load 12, which reduces a period in which the load current Iload is too high, so as to prevent over-current from damaging the load 12.

Noticeably, the spirit of the present invention is to utilize an energy storage device to output the control voltage Vcon2 with a specific voltage in a specific interval when short-circuit occurs, and thus to turn on the shutdown transistor 204 quickly, pulling the control voltage Vcon1 to the ground level such that the driving transistor 206 is turned off and stops outputting the input voltage Vin to the load 12, which reduces a period in which the load current Iload is too high, thereby preventing over-current from damaging the load 12 (i.e. the electronic device). Those skilled in the art should readily make modifications or alterations accordingly. For example, the energy storage module 310 is not limited to the embodiment of the present invention, as long as the control voltage Vcon2 with a specific voltage can be outputted in a specific interval after short-circuit occurs, to turn on the shutdown transistor 204 quickly. The shutdown transistor 204 and the driving transistor 206 are not limited to NMOS transistors, as long as signals can be properly adjusted to control the level of the control voltage Vcon1 to turn off the connection between the power supply 102 and the load 12 when short-circuit occurs, so as to stop outputting the input voltage Vin to the load 12.

Figure 5:
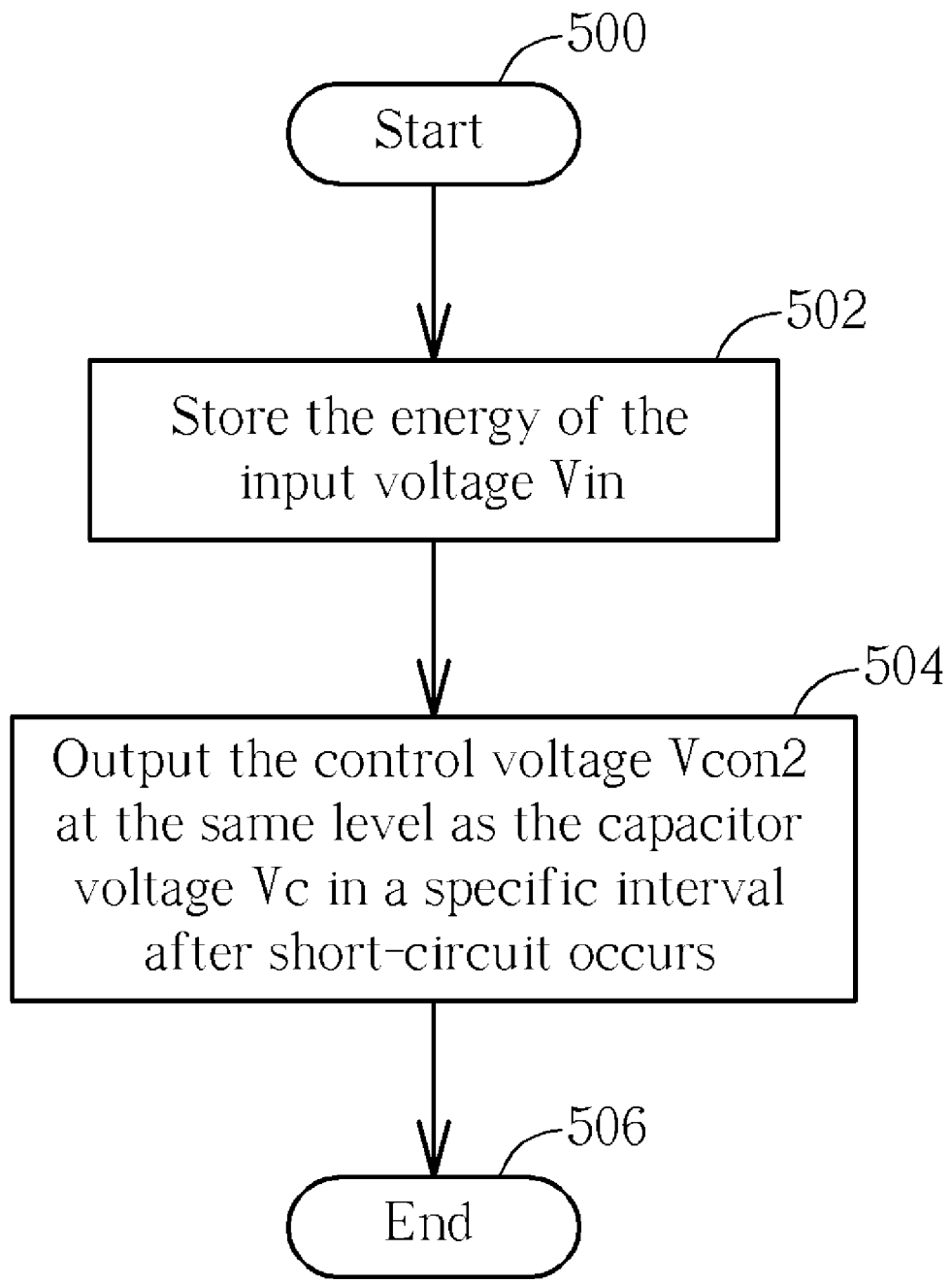
FIG. 5 is a schematic diagram of a short-circuit protection process according to an embodiment of the present invention.

Operations of the short-circuit protection circuit 304 can be summarized into a short-circuit protection process 50 as shown in FIG. 5. The short-circuit protection process 50 includes the following steps:

Step 500: Start.

Step 502: Store the energy of the input voltage Vin.

Step 504: Output the control voltage Vcon2 at the same level as the capacitor voltage Vc in a specific interval after short-circuit occurs.

Step 506: End.

In the prior art, since the control voltage Vcon2 is at the same level as the input voltage Vin, the control voltage Vcon2 drops due to the over-current, such that the control voltage Vcon1 cannot be pulled to the ground level to turn off the driving transistor 206 quickly, causing the load current Iload to be too high for a long period. In comparison, in the present invention, when short-circuit occurs, the control voltage Vcon2 is provided by the level shifter 318 utilizing the energy stored by the capacitor 316, and thus the level of the control voltage Vcon2 is the same as the capacitor voltage Vc and higher than the level of the input voltage Vin, so as to pull the control voltage Vcon1 to the ground level to turn off the driving transistor 206, and significantly reduce the period in which the load current Iload is too high, thereby preventing over-current from damaging the load 12.

To sum up, the present invention utilizes an energy storage device to output a specific voltage as a control voltage in a specific interval when short-circuit occurs, to significantly reduce the period in which the load current is too high, so as to prevent over-current from damaging the electronic device.

Those skilled in the art will readily observe that numerous modifications and alterations of the device and method may be made while retaining the teachings of the invention.

What is claimed is:

1. A short-circuit protection circuit for a power supply device, comprising:
    a driving transistor, for controlling to output an input voltage to a load according to a first control voltage;
    a shutdown transistor, coupled to the driving transistor, for controlling a level of the first control voltage according to a second control voltage; and
    an energy storage module, coupled to the shutdown transistor, for storing energy of the input voltage, to output a specific voltage as the second control voltage in a specific interval after short-circuit occurs, comprising:
        a current source, for receiving the input voltage, and outputting a charging current;
        a diode, coupled to the current source, for controlling conduction of the charging current according to a capacitor voltage and the input voltage;
        a capacitor, coupled to the diode, for generating the capacitor voltage after being charged by the charging current; and
        a level shifter, coupled to the capacitor, for outputting the second control voltage according to the capacitor voltage after short-circuit occurs.

2. The short-circuit protection circuit of claim 1, wherein the driving transistor and the shutdown transistor are N metal oxide semiconductor (MOS) transistors.

3. The short-circuit protection circuit of claim 2, wherein the shutdown transistor controls the first control voltage to be a low level when the second control voltage is a high level, such that the driving transistor stops outputting the input voltage to the load.

4. The short-circuit protection circuit of claim 2, wherein the shutdown transistor controls the first control voltage to be a high level when the second control voltage is a low level, such that the driving transistor outputs the input voltage to the load.

5. The short-circuit protection circuit of claim 1, wherein the diode is turned on if the input voltage minus a conduction voltage of the diode is greater than the capacitor voltage, and the diode is turned off if the input voltage minus the conduction voltage of the diode is less than the capacitor voltage.

6. A short-circuit protection method for a power supply device, comprising:
    storing energy of an input voltage, comprising:
        receiving the input voltage; and
        generating a charging current to charge a capacitor according to the input voltage, where a voltage across the capacitor is a capacitor voltage; and
    outputting a specific voltage as a control voltage in a specific interval after short-circuit occurs, comprising:
        controlling the charging current to charge the capacitor according to the capacitor voltage and the input voltage; and
        outputting the control voltage according to the capacitor voltage after short-circuit occurs.

7. The short-circuit protection method of claim 6, wherein the charging current charges the capacitor if the input voltage minus a conduction voltage of a diode is greater than the capacitor voltage, and the charging current stops charging the capacitor if the input voltage minus the conduction voltage of the diode is less than the capacitor voltage.

8. A power supply device, for providing power to a load, comprising:
    a power supply, for outputting an input voltage; and
    a short-circuit protection circuit, coupled to the power supply, comprising:
        a driving transistor, for controlling to output the input voltage to the load according to a first control voltage;
        a shutdown transistor, coupled to the driving transistor, for controlling a level of the first control voltage according to a second control voltage; and
        an energy storage module, coupled to the shutdown transistor, for storing energy of the input voltage, to output a specific voltage as the second control voltage in a specific interval after short-circuit occurs, comprising:
            a current source, for receiving the input voltage, and outputting a charging current;
            a diode, coupled to the current source, for controlling conduction of the charging current according to a capacitor voltage and the input voltage;
            a capacitor, coupled to the diode, for generating the capacitor voltage after being charged by the charging current; and
            a level shifter, coupled to the capacitor, for outputting the second control voltage according to the capacitor voltage after short-circuit occurs.

9. The power supply device of claim 8, wherein the driving transistor and the shutdown transistor are N metal oxide semiconductor (MOS) transistors.

10. The power supply device of claim 9, wherein the shutdown transistor controls the first control voltage to be a low level when the second control voltage is a high level, such that the driving transistor stops outputting the input voltage to the load.

11. The power supply device of claim 9, wherein the shutdown transistor controls the first control voltage to be a high level when the second control voltage is a low level, such that the driving transistor outputs the input voltage to the load.

12. The power supply device of claim 8, wherein the diode is turned on if the input voltage minus a conduction voltage of the diode is greater than the capacitor voltage, and the diode is turned off if the input voltage minus the conduction voltage of the diode is less than the capacitor voltage.

* * * * *